(12) United States Patent
Jackson (10) Patent No.: US 10,021,969 B2
(45) Date of Patent: Jul. 17, 2018

(54) DOCUMENT STAND UNIT

(71) Applicant: Lesley Jackson, New Castle, DE (US)

(72) Inventor: Lesley Jackson, New Castle, DE (US)

(73) Assignee: Lesley Jackson, New Castle, DE (US)

( * ) Notice: Subject to any disclaimer, the term of this patent is extended or adjusted under 35 U.S.C. 154(b) by 0 days.

(21) Appl. No.: 15/126,979

(22) PCT Filed: Mar. 18, 2015

(86) PCT No.: PCT/US2015/021148
§ 371 (c)(1),
(2) Date: Sep. 16, 2016

(87) PCT Pub. No.: WO2015/142982
PCT Pub. Date: Sep. 24, 2015

(65) Prior Publication Data
US 2017/0095073 A1      Apr. 6, 2017

Related U.S. Application Data

(60) Provisional application No. 61/955,306, filed on Mar. 19, 2014.

(51) Int. Cl.
*A47B 23/00* (2006.01)
*G09F 1/10* (2006.01)
*F16B 1/00* (2006.01)
*F16B 13/00* (2006.01)
*F16M 11/38* (2006.01)

(52) U.S. Cl.
CPC ............... *A47B 23/00* (2013.01); *F16B 1/00* (2013.01); *F16B 13/00* (2013.01); *F16M 11/38* (2013.01); *G09F 1/10* (2013.01); *F16B 2001/0035* (2013.01)

(58) Field of Classification Search
CPC . F16M 11/38; G09F 1/10; G09F 11/10; A47F 7/163; A47B 23/00; F16B 1/00; F16B 13/00; F16B 2001/0035
USPC ............ 248/448, 453, 441.1; 40/124, 124.4; 211/45
See application file for complete search history.

(56) References Cited

U.S. PATENT DOCUMENTS 1,681,586 A      8/1928   Kessler
2,557,399 A  *   6/1951   Teetor ..................... G09F 1/14
                                                       116/63 P (Continued)

OTHER PUBLICATIONS

International Search Report and Written Opinion in application No. PCT/US2015/021148, dated Jun. 25, 2015.

*Primary Examiner* — Anita M King
(74) *Attorney, Agent, or Firm* — Potter Anderson and Corroon LLP (57) ABSTRACT

A curved or straight document stand unit for supporting one or more documents is disclosed. The outside and inside surfaces of the document stand unit are vertically-oriented whereas both the top and bottom surfaces are planar. Further, the document stand unit disclosed herein has two longitudinal ends with vertically-oriented surfaces and a connection apparatus on at least one of the longitudinal ends. In the unit, the top planar surface and the bottom planar connect the outside surface and the inside surface. The top or bottom planar surface of the unit includes at least one slot or groove for insertion of a document.

7 Claims, 11 Drawing Sheets

(56) References Cited

U.S. PATENT DOCUMENTS

| | | | | |
|---|---|---|---|---|
| 3,272,183 | A * | 9/1966 | Craighead | B41J 29/15 |
| | | | | 248/441.1 |
| 4,266,771 | A * | 5/1981 | Carbone | A63F 1/10 |
| | | | | 273/150 |
| 4,291,882 | A * | 9/1981 | Del Monte | A63F 3/06 |
| | | | | 273/148 A |
| 4,453,714 | A * | 6/1984 | Houser | A63F 3/06 |
| | | | | 273/148 A |
| 4,521,035 | A * | 6/1985 | Berezowsky | B42F 1/00 |
| | | | | 24/555 |
| D290,077 | S * | 6/1987 | Hansen | D7/631 |
| 4,685,647 | A * | 8/1987 | Calhoun | B42F 17/16 |
| | | | | 248/444.1 |
| 5,075,515 | A | 12/1991 | Yoneda et al. | |
| 5,295,590 | A * | 3/1994 | Feer | A47G 21/16 |
| | | | | 211/50 |
| 5,775,663 | A | 7/1998 | Fitzsimmons et al. | |
| 5,857,654 | A | 1/1999 | Berman | |
| 5,911,398 | A * | 6/1999 | VanLandingham, Jr. | A47B 21/045 |
| | | | | 248/441.1 |
| 6,059,249 | A | 5/2000 | Scatterday | |
| 6,695,219 | B1 * | 2/2004 | Fowler, Sr. | A63H 19/30 |
| | | | | 238/10 B |
| D542,860 | S * | 5/2007 | Davis | D21/392 |
| 7,568,674 | B2 * | 8/2009 | Polster | A47B 23/002 |
| | | | | 248/441.1 |
| 8,136,785 | B1 * | 3/2012 | Polster | A47B 23/043 |
| | | | | 248/444.1 |
| 8,371,455 | B2 * | 2/2013 | Kim | G09F 1/14 |
| | | | | 211/49.1 |
| 9,220,990 | B2 * | 12/2015 | Mataya | A63H 18/023 |
| 2004/0021052 | A1 * | 2/2004 | Dagan | A47G 1/17 |
| | | | | 248/441.1 |
| 2010/0219322 | A1 * | 9/2010 | Neves Moreira | A47B 23/041 |
| | | | | 248/450 |

* cited by examiner

DOCUMENT STAND UNIT

FIELD OF INVENTION

This invention generally relates to a document stand unit that can support paper or such flexible thin sheet material in an upright position for displaying both sides of such flexible thin sheet material. The document stand unit has at least one slot or groove, either on the top surface or bottom surface area, and connection apparatus at both longitudinal ends of the unit. The connection apparatus helps connect two or more such document stand units.

BACKGROUND

Document stands typically use one of several types of support systems for the displayed sheet material. One type typically uses both base and rear supports against which the sheets can rest flatly, in an inclined position. This easel type of document stand is relatively bulky and takes up substantial desk space, both horizontally and vertically. The rear support upon which the sheets recline generally covers most or all of the length and width of the sheets.

Another type of document stand uses a top support from which it can clip the top of the sheets and hang them vertically. Though it may take up less desk space than the easel type device, it is often unsightly and generally requires two hands free to clip and un-clip sheets for viewing. When used as a copy holder for documents in an activity such as typing on a computer keyboard while viewing a monitor, it requires removing both hands from the keyboard in order to clip or un-clip a sheet. This forces the user to glance downwards and away from the documents while repositioning both hands back onto the keyboard.

SUMMARY OF INVENTION

This invention relates to a curved document stand unit for supporting one or more documents, comprising:
(A) an outside arc that forms an outside vertically-oriented surface of said document stand unit;
(B) a smaller inside arc that forms an inside vertically-oriented surface of the document stand unit;
(C) a top planar surface;
(D) the bottom planar surface;
(E) a first longitudinal end having a first vertically-oriented surface and a second longitudinal end having a second vertically-oriented surface; and
(F) at least one connection apparatus at each of said document stand unit's longitudinal ends;
wherein said top planar surface and said bottom planar are generally parallel to each other and connect said outside arc and said inside arc;
wherein at least one of said top planar surface or said bottom planar surface comprise at least one slot or groove for insertion of said document; and
wherein said curved document stand comprises at least one connection apparatus at said first longitudinal end and/or at second longitudinal end.

This invention also relates to a straight document stand unit for supporting one or more documents, comprising:
(A) an outside vertically-oriented surface of said document stand unit;
(B) an inside vertically-oriented surface of the document stand unit;
(C) a top planar surface;
(D) the bottom planar surface;
(E) a first longitudinal end having a first vertically-oriented surface and a second longitudinal end having a second vertically-oriented surface; and
(F) at least one connection apparatus at each of said document stand unit's longitudinal ends;
wherein said top planar surface and said bottom planar are generally parallel to each other and connect said outside vertically-oriented surface and said inside vertically-oriented surface;
wherein at least one of said top planar surface or said bottom planar surface comprise at least one slot or groove for insertion of said document; and
wherein said straight document stand comprises at least one connection apparatus at said first longitudinal end and/or at second longitudinal end.

DETAILED DESCRIPTION OF THE INVENTION

It is not intended that the invention be limited to the specific terms, each specific term including all technical equivalents which operate in a similar manner to accomplish a similar purpose.

The term document or paper is used generically to describe any thin flexible sheet material. The document stand unit is illustrated to demonstrate the diversity of forms one or multiple document stand units as a whole can take to support paper.

Generally, the document stand unit is a curved strip comprising an arc that forms the outside vertically-oriented surface of the strip, a smaller arc that forms the inside vertically-oriented surface of the strip, the top planar surface, the bottom planar surface, wherein the top planar surface and the bottom planar are generally parallel to each other and connect the outside and the inside arcs, wherein at least one of the top planar surface or the bottom planar surface comprises at least one slot or groove for insertion of the document, and wherein said curved strip comprises a connection means at each of its ends.

In one embodiment, the document stand unit is shaped equal to one quarter of the circumference of a circle. Because a circle measured in degree equals 360°, one quarter of the circumference would measure 90°. In another embodiment, the document stand unit length ranges from about 25° to 360°. For example, the document stand unit could 25°, 26°, 27°, . . . , to 358°, 359°, and 360°. For brevity, the degrees between 27° and 360° are not mentioned here. But the present invention fully envisions the document stand unit in lengths that are in between the two numbers 27° and 360°, with a periodicity on 1°. In a preferred embodiment, the document stand unit is 45°, 90°, 180°, 270°, and 360°.

In another embodiment, multiple document stand units are connected to each other. The multiple document stand units include more than one such document stand units selected from document stand units that can be 25°, 26°, 27°, . . . , to 358°, 359°, and 360° in length. For brevity, the degrees between 27° and 360° are not mentioned here. But the present invention fully envisions the document stand unit in lengths that are in between the two numbers 27° and 360°, with a periodicity on 1°. In a preferred embodiment, the document stand unit is 45°, 90°, 180°, 270°, and 360°.

In one embodiment, the horizontal (or longitudinal) dimension of said strip is at least equal in length as compared to the height of the strip.

In another embodiment, the document stand unit while curved in its longitudinal direction, does not conform as a segment of a specific circle. For example, it could be a segment of a oblong shaped structure or a zigzag.

In yet another embodiment, the document stand unit is a straight strip, without any curvature. In another embodiment, at least one document stand unit that is a straight strip is connected with at least one other document stand unit that may or may not be a straight strip. In yet another embodiment, at least one document stand unit that is a straight strip is connected within a series of other document stand units that may or may not be straight strips.

The term connection apparatus or connection means is used generally to describe a means with which to connect one like unit to another or the means to attach something that promotes connecting one like unit to another. Each identical unit has connection apparatus at both sides of the unit. The connection apparatus can be located at the vertically-oriented surface at the longitudinal end of the document stand unit or on the top surface or on the bottom surface at the longitudinal end of the document stand unit. In one embodiment, the connection apparatus is a magnet. The connection apparatus—magnet, in this embodiment—can be concealed within the document stand unit or externally attached at the longitudinal end of document stand unit. In another embodiment, the connection apparatus is a peg-and-hole connection apparatus. In yet another embodiment, the connection apparatus is a hinge connection apparatus. In other embodiments, a document stand unit could have one type of connection apparatus on one longitudinal end and another type of connection apparatus on the other longitudinal end. In yet another embodiment, a document stand unit could have more than one connection apparatus on one or both longitudinal ends of the document stand unit. For example, a document stand unit could have a magnet as connection apparatus on the vertically-oriented surface at the longitudinal end and a magnet on the top surface. A longitudinal end could have two connection apparatus both using different mechanisms, for example, magnet and a peg-and-hole connection. In a further embodiment, a document stand unit could have different types of connection apparatus on either ends and/or different number of connection apparatus on either end.

In one embodiment, at least two document stand units are connected end-to-end.

In one embodiment, surface space that is naturally created between the arc shapes represents a flat top surface area and an equal flat bottom surface area, the width of which is determined by the requirement. The distance between the top surface and the bottom surface along the longest arc represents the front, that is the outside vertically-oriented surface. The distance between the top surface and the bottom surface along the shortest arc represents the back or the inside vertically-oriented surface. The distance between the top and bottom surface at either side, between the longest arc and the shortest arc, represents the left and right sides (or the longitudinal ends), both of which are flat.

In a preferred embodiment, a symmetrical unit is comprised of an outside arc, a smaller inside arc some distance from the first, a width between the arcs that form a flat top surface and an equal bottom surface, a width between the top and bottom surface that forms a long curved front and a shorter curved back at the same arc angle, and two equal flat side areas.

The term slot or groove is used generally to describe the article receiving mechanism for a sheet of paper. Each identical unit has at least one slot or groove, either on the top surface or the bottom surface or on the top and bottom surface areas. If there are more than one slots, the slots could be parallel to each other or to the proximate arc, outside or inside. The slots need not be parallel to each other or to the outside or the inside arc.

In one embodiment, each slot or groove is vertical and parallel to the front and/or back surfaces of the unit. Each slot or groove system is positioned so that the outer-most slots or grooves equal in distance from the curved edges of the unit, and each slot or groove is an equal distance apart from each other.

Figure 1:
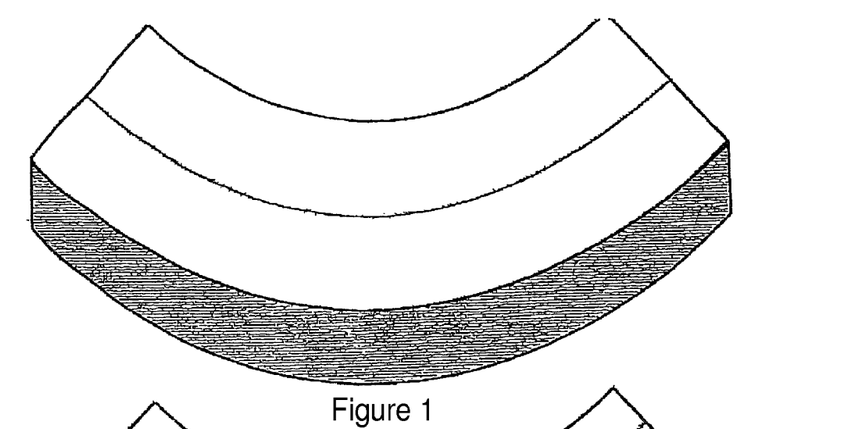
FIG. 1 is a top perspective view, depicting a single slot system in the document stand unit.
Figure 2:
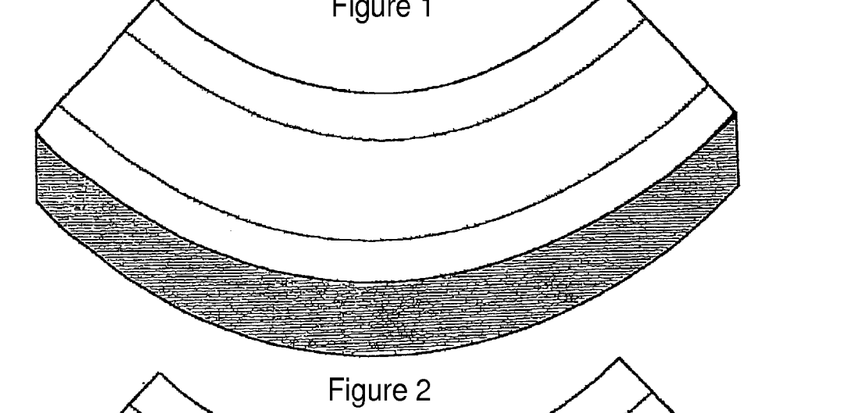
FIG. 2 is a top perspective view, depicting a double slot system in the document stand unit.
Figure 3:
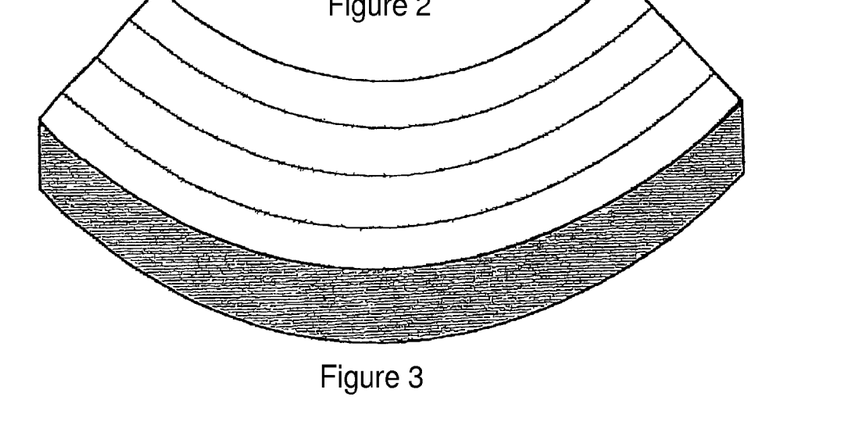
FIG. 3 is a top perspective view, depicting a triple slot system in the document stand unit.
Figure 4:
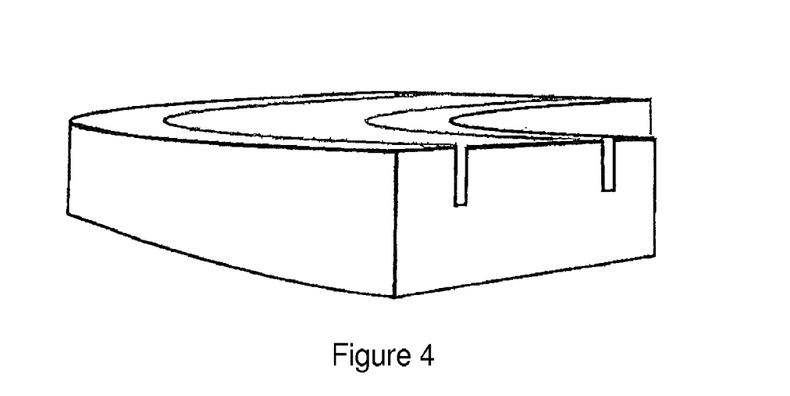
FIG. 4 is a side perspective view, depicting a double slot system in the document stand unit.
Figure 5:
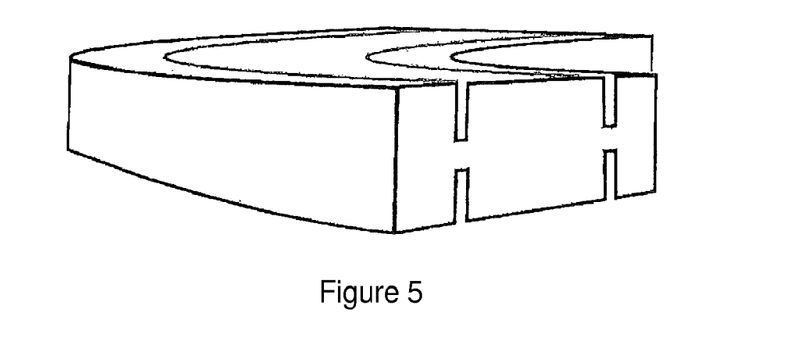
FIG. 5 is a side perspective view, depicting a double slot system in the document stand unit.
Figure 6:
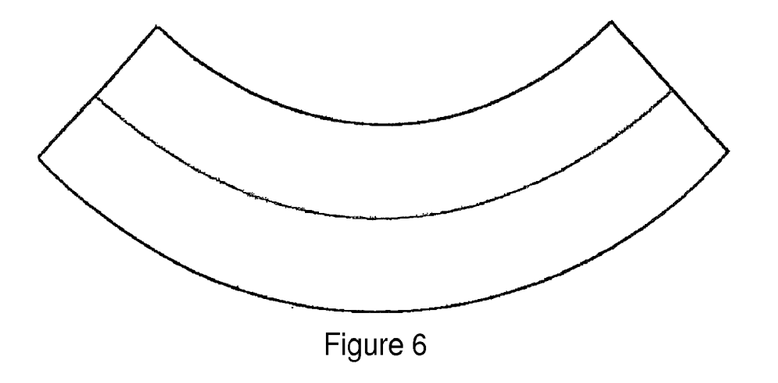
FIG. 6 is a top view, depicting a single slot system in the document stand unit.
Figure 7:
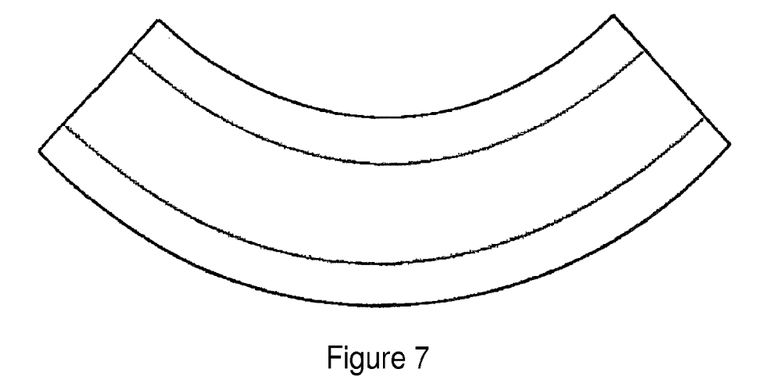
FIG. 7 is a top view, depicting a double slot system in the document stand unit.
Figure 8:
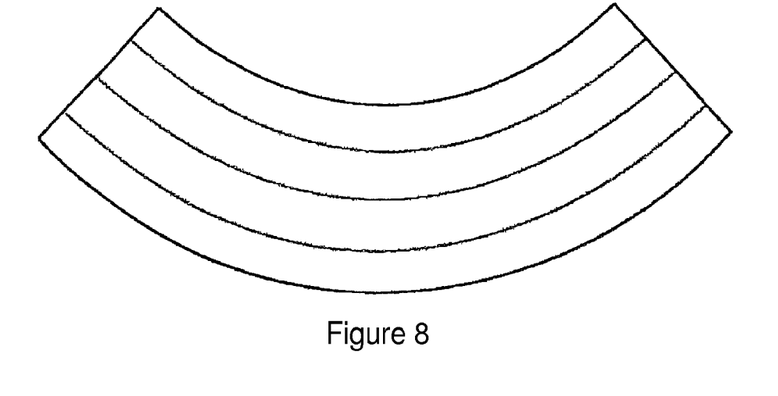
FIG. 8 is a top view, depicting a triple slot system in the document stand unit.
Figure 9:
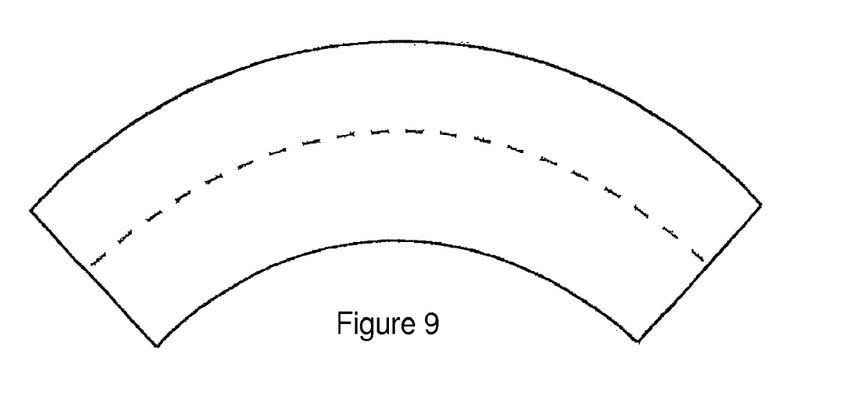
FIG. 9 is a bottom view, depicting a single slot system in the document stand unit.
Figure 10:
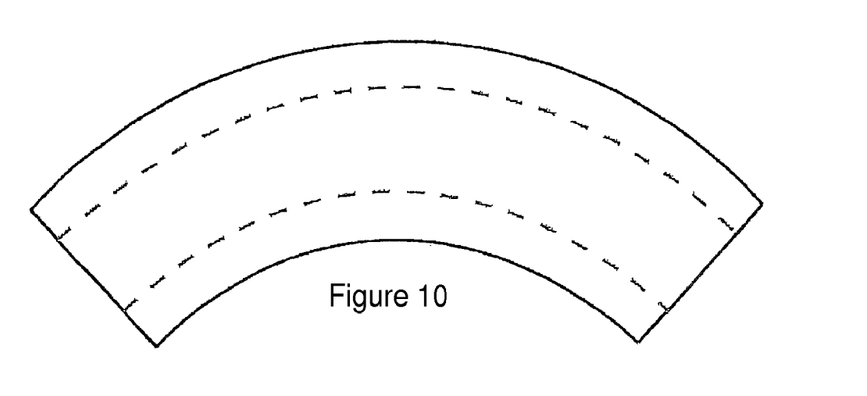
FIG. 10 is a bottom view, depicting a double slot system in the document stand unit.
Figure 11:
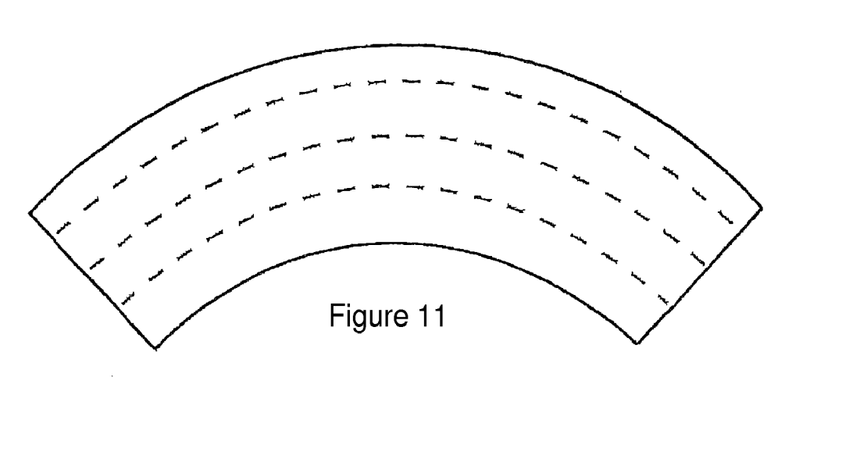
FIG. 11 is a bottom view, depicting a triple slot system in the document stand unit.
Figure 12:
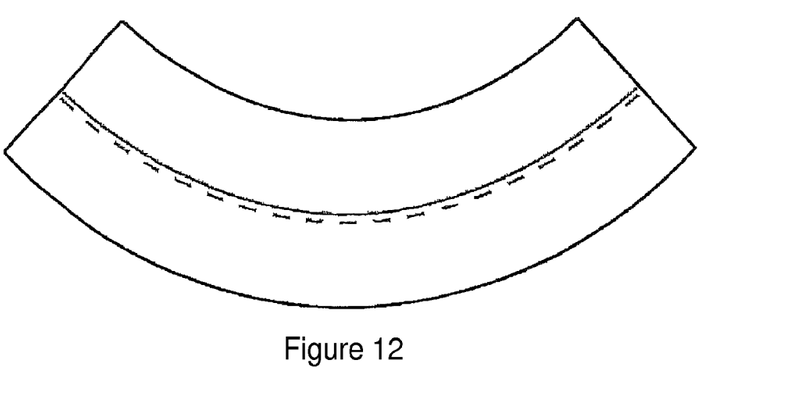
FIG. 12 is a top view, depicting a single slot system in the document stand unit.
Figure 13:
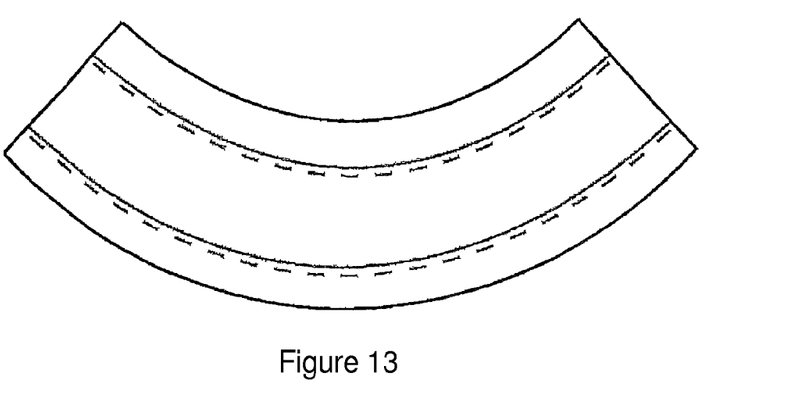
FIG. 13 is a top view, depicting a double slot system in the document stand unit.
Figure 14:
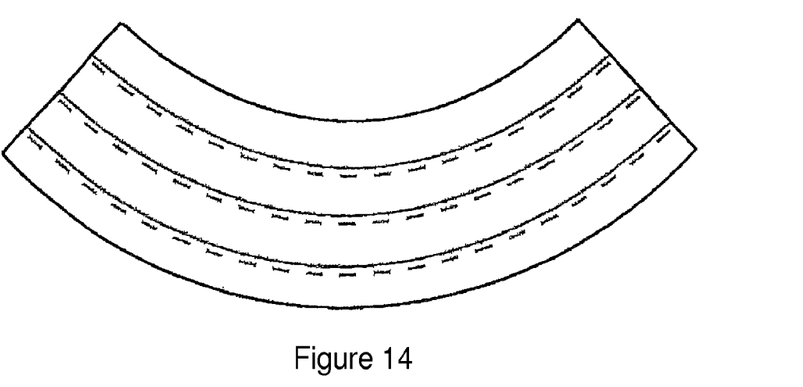
FIG. 14 is a top view, depicting a triple slot system in the document stand unit.
Figure 15:
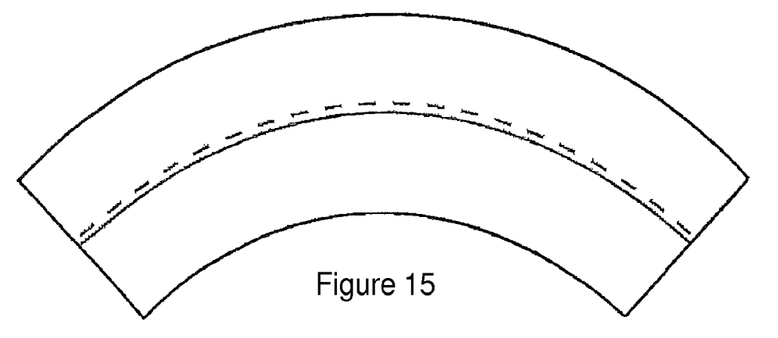
FIG. 15 is a bottom view, depicting a single slot system in the document stand unit.
Figure 16:
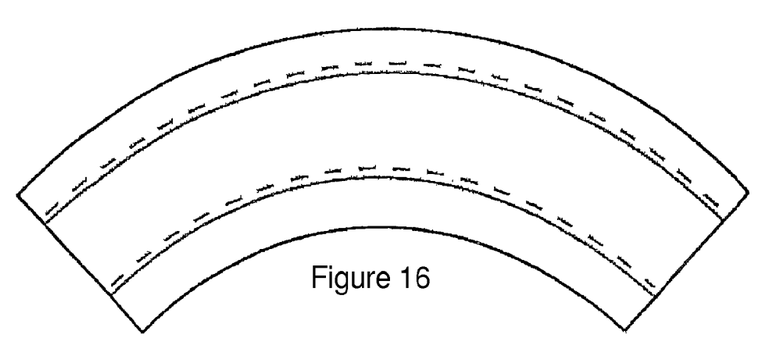
FIG. 16 is a bottom view, depicting a double slot system in the document stand unit.
Figure 17:
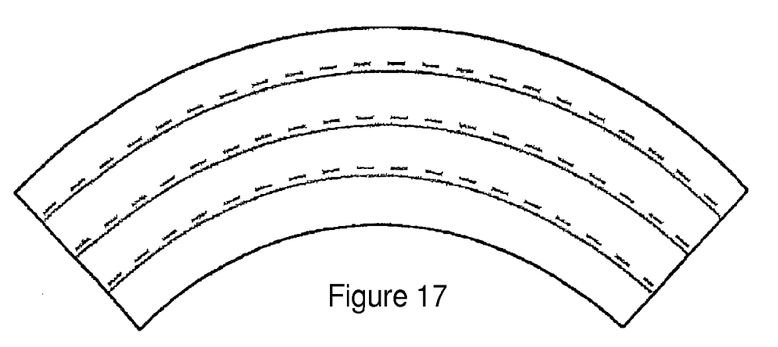
FIG. 17 is a bottom view, depicting a triple slot system in the document stand unit.
Figure 18:
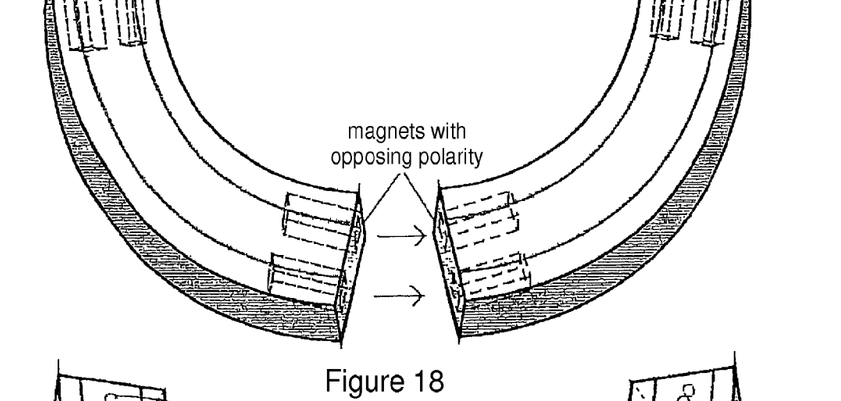
FIG. 18 is a top perspective view of a magnet connection apparatus, one of several possible connection types.
Figures 19, 20:
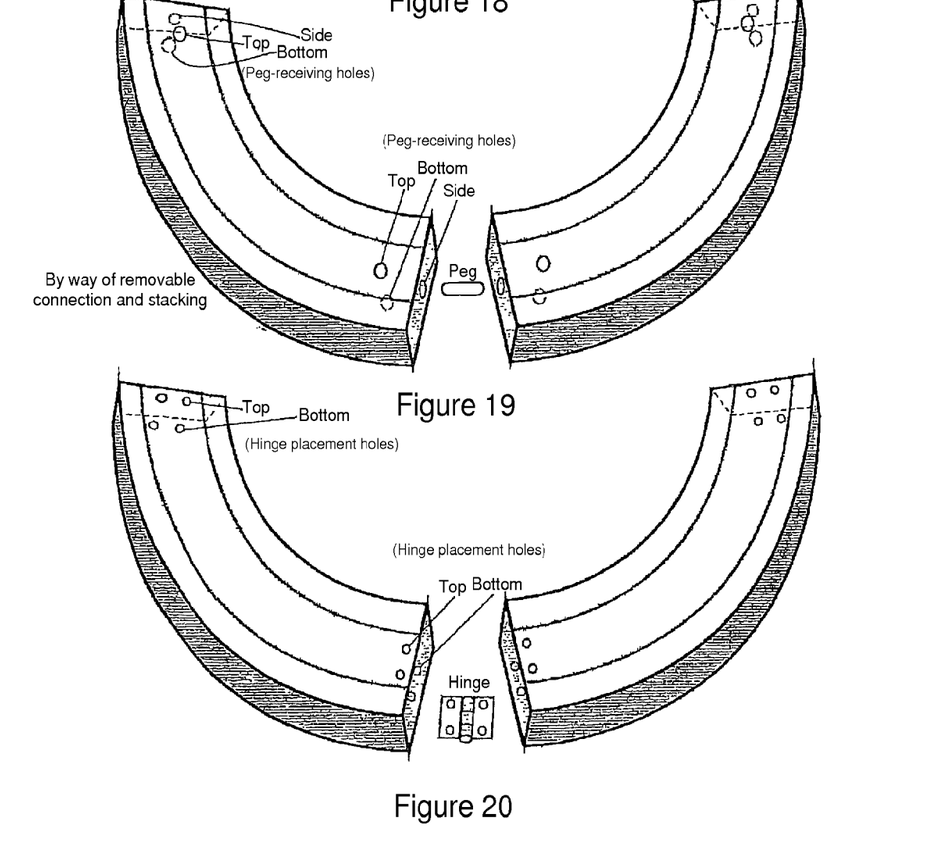
FIG. 19 is a top perspective view of a peg-and-hole connection apparatus, one of several possible connection types.
FIG. 20 is a top perspective view of a hinge connection apparatus, one of several possible connection types.
Figure 21:
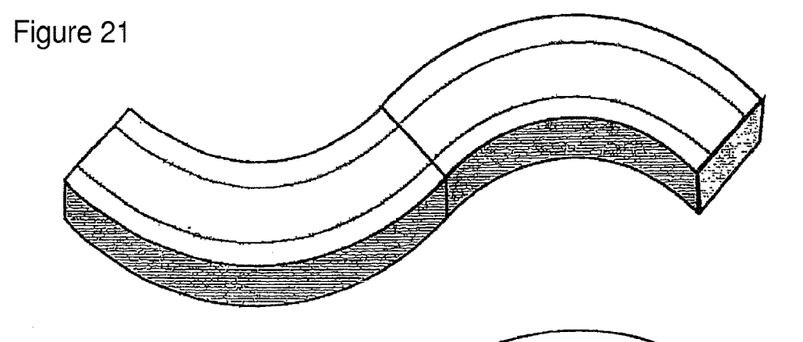
FIG. 21 is an example of one possible connection, among several possibilities, made with two like units forming the document stand.
Figure 22:
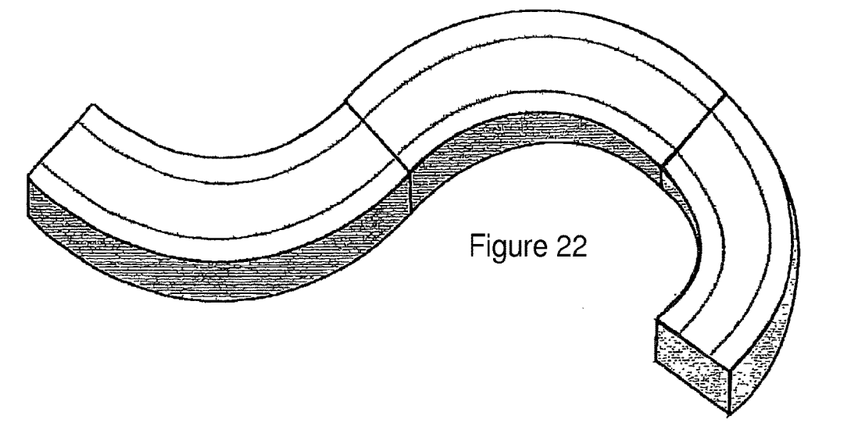
FIG. 22 is an example of a second possible connection, among several possibilities, made with three like units forming the document stand.
Figure 23:
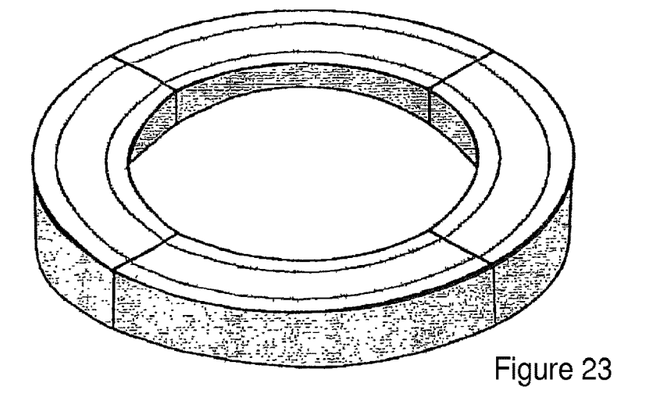
FIG. 23 is an example of a third possible connection, among several possibilities, made with four like units forming the document stand.
Figure 24:
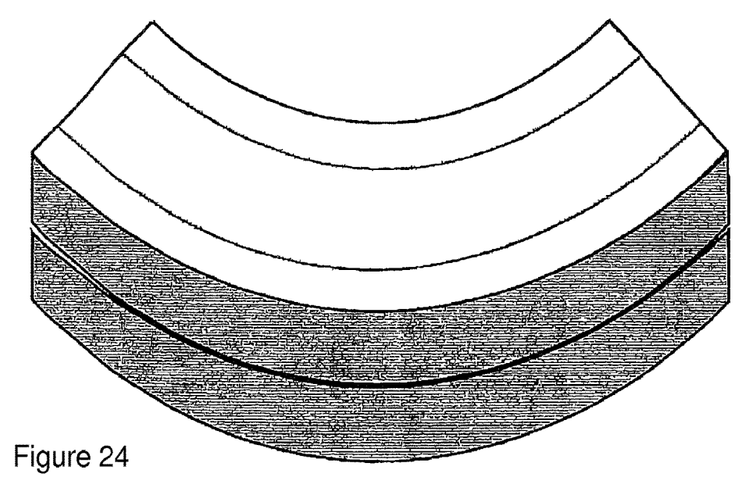
FIG. 24 is an example, among several possibilities, of two removably stacked units forming the document stand.
Figure 25:
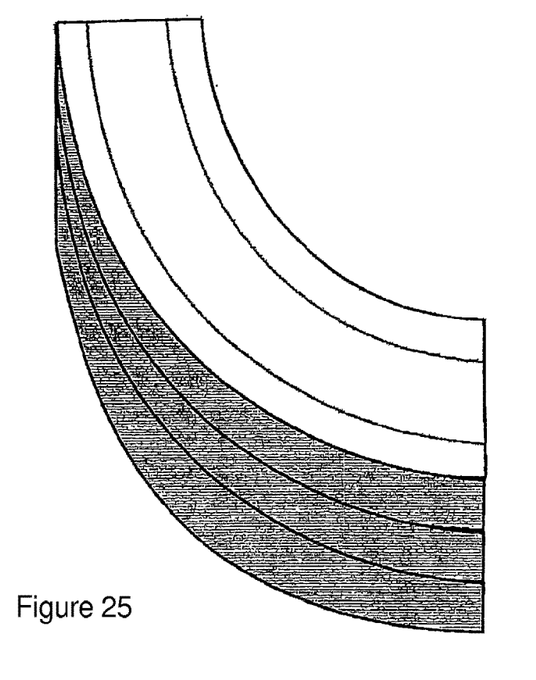
FIG. 25 is an example, among several possibilities, of three removably stacked units forming the document stand.
Figure 26:
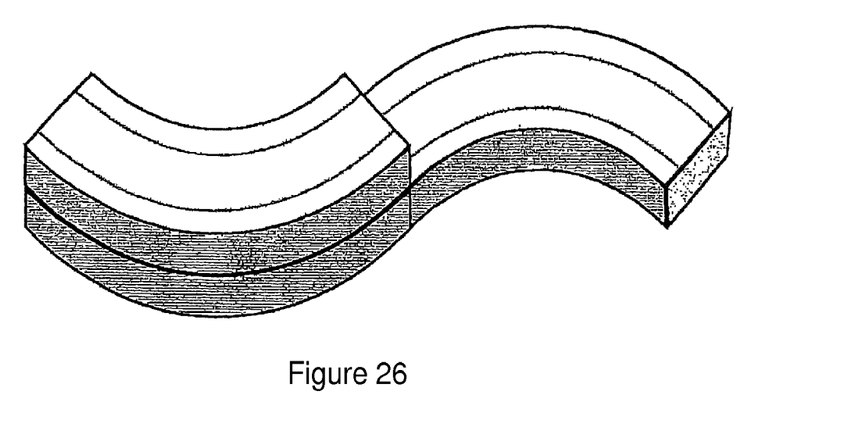
FIG. 26 is an example, among several possibilities, of a document stand arranged by a combination of removably connecting and removably stacking three units.
Figure 27:
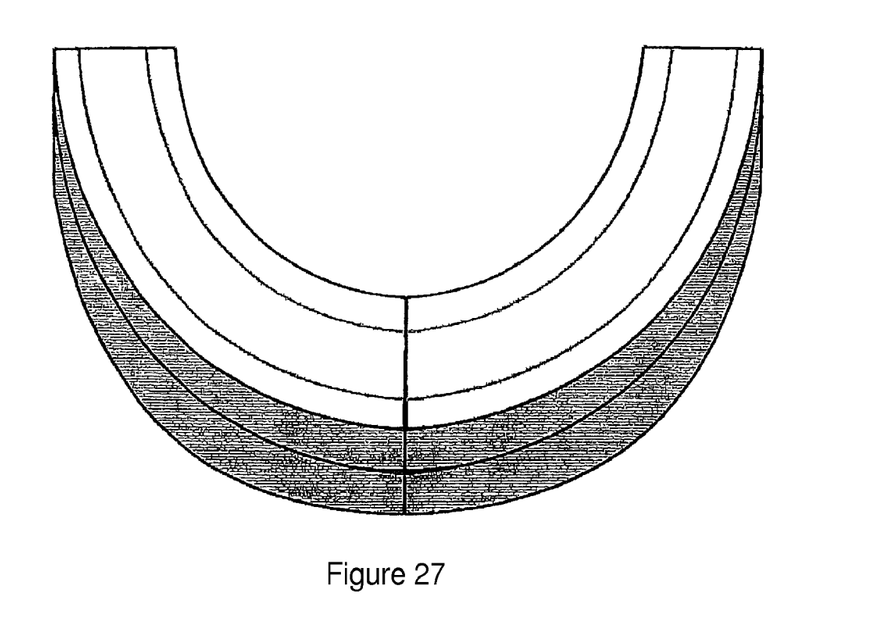
FIG. 27 is an example, among several possibilities, of a document stand arranged by a combination of removably connecting and removably stacking four units.
Figure 28:
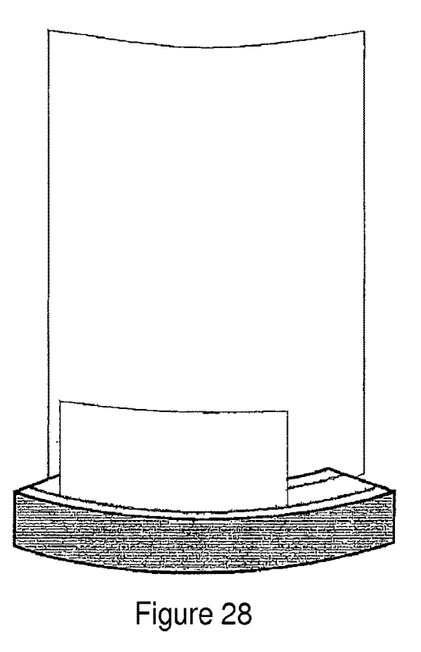
FIG. 28 is an example of a one-unit document stand, consisting of a double slot or groove system, with paper inserted.
Figure 29:
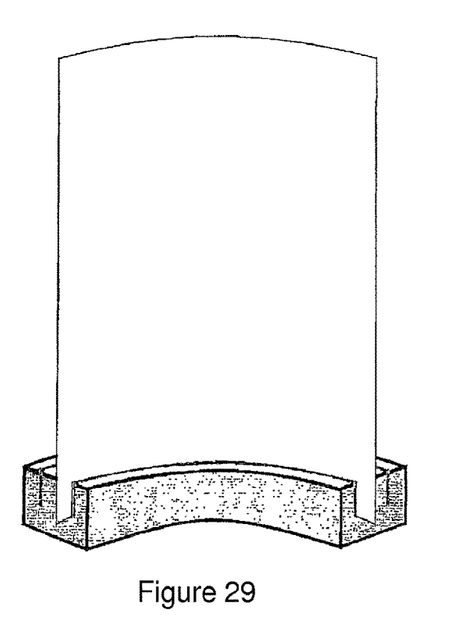
FIG. 29 is an example of the back of the same one-unit document stand as in the previous figure with paper inserted.

In one embodiment, two or more document stand units are stacked one over the other. Said units could also be connected to two more more adjacent document stand units (See for example, FIGS. 24-27).

In a preferred embodiment, when there are identical units that use both top and bottom surfaces, the slot or groove system is identical on the top and bottom surface.

In one embodiment, the document stand unit can be used for supporting one or more sheets of paper, or other thin flexible material, by itself or in connection with other like units, the shape of the unit naturally accommodates stacking like units, without limiting functionality, to create various convenient and useful vertical configurations for displaying sheet(s) of paper; connecting like units to create various convenient and useful horizontal configurations for displaying sheet(s) of paper around an object; and/or connecting like units to extend the functionality of the units without limiting the width of the inserted sheet(s) of paper.

In another preferred embodiment, the document stand unit contains identical connection apparatus (for example, magnet, peg-and-hole, hinges) at either end, such that it makes it possible and easy to removably connect one unit to another, from either end of either unit, for various convenient and useful configurations without the need for instructions; and/or it makes it possible and easy to removably stack one unit on top of another for various convenient and useful configurations without the need for instructions.

In another embodiment of the invention, the document stand unit contains at least one groove or slot of consistent depth with which to hold one or more sheets of paper or other thin flexible material, where each slot or groove is positioned to support paper in a non-slanted and upright position (and can be made to preferred depth and width specifications) making it possible to view paper sheet from either side without disturbing the position of the inserted sheet; is positioned with the outer-most slots or grooves equal in distance from the curved edges of the unit, making the connection of multiple and like units a continuous groove or slot system from either end of either unit for various convenient and useful configurations; and/or is positioned so that each groove is an equal distance apart from each other, making the connection of multiple and like units a continuous groove or slot system from either end of either unit for various convenient and useful configurations.

In a preferred embodiment, the document stand unit as set forth above includes at least one curved slot or groove system on the top surface and an identical slot or groove system on the bottom surface in order to accommodate versatility in assembly, representing a second preferred embodiment of the invention.

The symmetry and shape of the document stand unit, combined with the system of slots or grooves following the length of the curved unit and the various connection apparatus, allow for versatility in vertical and horizontal display and flexibility in design and ease of manufacture, assembly, and use by way of removable connection and stacking.

The invention claimed is:

1. A curved document stand unit for supporting one or more documents, comprising:
   (A) an outside arc that forms an outside vertically-oriented surface of the document stand unit;
   (B) a smaller inside arc that forms an inside vertically-oriented surface of the document stand unit;
   (C) a top planar surface;
   (D) a bottom planar surface;
   (E) a first longitudinal end having a first vertically-oriented surface and a second longitudinal end having a second vertically-oriented surface; and
   (F) at least one connection apparatus at each of the first and second longitudinal ends;
   wherein the top planar surface and the bottom planar are generally parallel to each other and connect the outside arc and the inside arc;
   wherein the document stand unit comprises at least one slot or groove for insertion of documents in both the top planar surface and the bottom planar surface, such that the document stand unit can accept a document in top-up or bottom-up orientation;
   wherein the curved document stand unit comprises at least one connection apparatus at the first longitudinal end and/or at the second longitudinal end;
   wherein the curved document stand unit is configured as a segment of a circle between a quarter circle and a half circle; and
   wherein the curved document stand unit is configured such that up to four of the stand units are joinable end to end to form a circular structure.

2. The curved document stand unit of claim 1, wherein the first or the second longitudinal end comprises the at least one connection apparatus located in a position selected from the group consisting of vertically-oriented surface, top surface, bottom surface, and combinations thereof.

3. The curved document stand unit of claim 1, wherein the connection apparatus is selected from the group consisting of magnet, peg-and-hole, hinge connection apparatus, and combinations thereof.

4. The curved document stand unit of claim 1, wherein the connection apparatus is a magnet concealed within the first and the second longitudinal ends of the curved document stand unit.

5. A plurality of document stand units according to claim 1, wherein the document stand units are removably connected with each other.

6. The plurality of removably connected document stand units of claim 5, wherein the plurality of units are connected with each other in a configuration selected from the group consisting of end-to-end, stacking on top of one another, parallel, and combination thereof.

7. The document stand unit of claim 1, wherein the document stand unit is molded as a single symmetrical piece.

* * * * *